(12) United States Patent
Birmingham et al.

(10) Patent No.: US 8,418,039 B2
(45) Date of Patent: Apr. 9, 2013

(54) EFFICIENT ERROR CORRECTION SCHEME FOR DATA TRANSMISSION IN A WIRELESS IN-BAND SIGNALING SYSTEM

(75) Inventors: Kiley Birmingham, Seattle, WA (US); Leon L. Hong, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 322 days.

(21) Appl. No.: 12/835,519

(22) Filed: Jul. 13, 2010

(65) Prior Publication Data
US 2011/0029832 A1  Feb. 3, 2011

Related U.S. Application Data

(60) Provisional application No. 61/230,930, filed on Aug. 3, 2009.

(51) Int. Cl.
*H03M 13/00* (2006.01)
(52) U.S. Cl. ........................................... 714/776
(58) Field of Classification Search .................. None
See application file for complete search history.

(56) References Cited

U.S. PATENT DOCUMENTS

| | | |
|---|---|---|
| 3,742,197 A | 6/1973 | Pommerening |
| 3,742,463 A | 6/1973 | Haselwood |
| 3,971,888 A | 7/1976 | Chiang |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Lofberg |
| 4,598,272 A | 7/1986 | Cox |
| 4,599,583 A | 7/1986 | Shimozono |

(Continued)

FOREIGN PATENT DOCUMENTS

| | | |
|---|---|---|
| CA | 2242495 | 1/2000 |
| DE | 44 24 412 A1 | 1/1996 |

(Continued)

OTHER PUBLICATIONS

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

(Continued)

*Primary Examiner* — Guerrier Merant
(74) *Attorney, Agent, or Firm* — Stolowitz Ford Cowger LLP

(57) ABSTRACT

In one example, a mobile device segments a payload for transmission to a remote server and provides redundant data for each payload segment. The remote server examines the received payload on a per segment basis using the redundant data to identify segments associated with errors. The server then requests error correction bits for the identified segments using one or more exchanges with the mobile device. Thereafter, the server can perform error correction using the received error correction bits and then request re-transmission of the payload, if needed.

22 Claims, 5 Drawing Sheets

U.S. PATENT DOCUMENTS

| | | |
|---|---|---|
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,817,089 A | 3/1989 | Paneth |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg et al. |
| 5,043,736 A | 8/1991 | Darnell et al. |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby, III |
| 5,317,309 A | 5/1994 | Vercellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,533,121 A | 7/1996 | Suzuki |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,635,450 A | 6/1997 | Mayer |
| 5,637,355 A | 6/1997 | Stanforth |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles, II |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson, Jr. |
| 5,732,326 A | 3/1998 | Maruyama |
| 5,734,981 A | 3/1998 | Kennedy, III |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob |

| | | |
|---|---|---|
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,778,024 A | 7/1998 | McDonough |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott |
| 5,797,091 A | 8/1998 | Clise |
| 5,804,810 A | 9/1998 | Woolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley |
| 5,892,454 A | 4/1999 | Schipper |
| 5,901,179 A | 5/1999 | Urabe |
| 5,911,129 A | 6/1999 | Towell |
| 5,912,886 A | 6/1999 | Takahashi |
| 5,913,170 A | 6/1999 | Wortham |
| 5,915,210 A | 6/1999 | Cameron |
| 5,917,449 A | 6/1999 | Sanderford |
| 5,918,180 A | 6/1999 | Dimino |
| 5,930,340 A | 7/1999 | Bell |
| 5,930,722 A | 7/1999 | Han |
| 5,933,468 A | 8/1999 | Kingdon |
| 5,936,526 A | 8/1999 | Klein |
| 5,937,355 A | 8/1999 | Joong |
| 5,940,598 A | 8/1999 | Strauss |
| 5,945,944 A | 8/1999 | Krasner |
| 5,946,304 A | 8/1999 | Chapman |
| 5,946,611 A | 8/1999 | Dennison |
| 5,949,335 A | 9/1999 | Maynard |
| 5,953,694 A | 9/1999 | Pillekamp |
| 5,960,363 A | 9/1999 | Mizikovsky |
| 5,961,608 A | 10/1999 | Onosaka |
| 5,963,130 A | 10/1999 | Schlager |
| 5,963,134 A | 10/1999 | Bowers |
| 5,970,130 A | 10/1999 | Katko |
| 5,978,676 A | 11/1999 | Guidri |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine |
| 6,014,089 A | 1/2000 | Tracy |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,121,922 A | 9/2000 | Mohan |
| 6,122,271 A | 9/2000 | McDonald |
| 6,122,514 A | 9/2000 | Spaur |
| 6,131,067 A | 10/2000 | Girerd |
| 6,131,366 A | 10/2000 | Fukuda |
| 6,133,874 A | 10/2000 | Krasner |
| 6,140,956 A | 10/2000 | Hillman |
| 6,144,336 A | 11/2000 | Preston |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |
| 6,195,736 B1 | 2/2001 | Lisle |
| 6,208,959 B1 | 3/2001 | Jonsson |
| 6,212,207 B1 | 4/2001 | Nichols |
| 6,226,529 B1 | 5/2001 | Bruno |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotichini |
| 6,300,875 B1 | 10/2001 | Schafer |
| 6,301,480 B1 | 10/2001 | Kennedy, III |
| 6,304,186 B1 | 10/2001 | Rabanne |
| 6,304,637 B1 | 10/2001 | Mirashrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,358,145 B1 | 3/2002 | Wong |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III |
| 6,430,162 B1 | 8/2002 | Reese |
| 6,430,176 B1 | 8/2002 | Christie, IV |
| 6,434,198 B1 | 8/2002 | Tarraf |
| 6,466,582 B2 | 10/2002 | Venters |
| 6,470,046 B1 | 10/2002 | Scott |
| 6,477,633 B1 | 11/2002 | Grimmett |
| 6,493,338 B1 | 12/2002 | Preston |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,545,988 B1 | 4/2003 | Skog |

| | | |
|---|---|---|
| 6,611,804 B1 | 8/2003 | Dörbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston |
| 6,683,855 B1 | 1/2004 | Bordogna |
| 6,690,681 B1 * | 2/2004 | Preston et al. ............... 370/493 |
| 6,690,922 B1 | 2/2004 | Lindemann |
| 6,697,987 B1 | 2/2004 | Lee |
| 6,700,867 B2 | 3/2004 | Classon |
| 6,707,421 B1 | 3/2004 | Drury |
| 6,747,571 B2 | 6/2004 | Fierro et al. |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tiburtius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,283,904 B2 | 10/2007 | Benjamin |
| 7,286,522 B2 | 10/2007 | Preston |
| 7,317,696 B2 | 1/2008 | Preston |
| 7,372,833 B2 | 5/2008 | Kyrönaho |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,508,810 B2 | 3/2009 | Moinzadeh |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 | 9/2009 | Holmes |
| 7,586,240 B2 | 9/2009 | Tsuda |
| 7,593,449 B2 | 9/2009 | Shattil |
| 7,606,555 B2 | 10/2009 | Walsh |
| 7,653,383 B2 | 1/2010 | Natarajan |
| 7,688,260 B2 | 3/2010 | Pomerantz |
| 7,701,954 B2 | 4/2010 | Rabenko |
| 7,733,853 B2 | 6/2010 | Moinzadeh |
| 7,747,281 B2 | 6/2010 | Preston |
| 7,809,367 B2 | 10/2010 | Hellaker |
| 7,848,763 B2 | 12/2010 | Fournier |
| 7,856,240 B2 | 12/2010 | Gunn |
| 7,924,934 B2 | 4/2011 | Birmingham |
| 7,979,095 B2 | 7/2011 | Birmingham |
| 7,983,310 B2 | 7/2011 | Hirano |
| 8,036,201 B2 | 10/2011 | Moinzadeh |
| 8,036,600 B2 | 10/2011 | Garrett |
| 8,068,792 B2 | 11/2011 | Preston |
| 2002/0022465 A1 | 2/2002 | McCullagh |
| 2002/0071432 A1 * | 6/2002 | Soderberg et al. ............ 370/389 |
| 2002/0097706 A1 | 7/2002 | Preston |
| 2002/0111167 A1 | 8/2002 | Nguyen |
| 2002/0122401 A1 | 9/2002 | Xiang |
| 2003/0016639 A1 | 1/2003 | Kransmo |
| 2003/0206625 A9 | 11/2003 | Ahmad |
| 2003/0212562 A1 | 11/2003 | Patel |
| 2003/0227939 A1 | 12/2003 | Yukie |
| 2004/0034529 A1 | 2/2004 | Hooper, III |
| 2004/0192345 A1 | 9/2004 | Osborn |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan |
| 2005/0215228 A1 | 9/2005 | Fostick |
| 2005/0226202 A1 | 10/2005 | Zhang |
| 2005/0278169 A1 | 12/2005 | Hardwick |
| 2006/0059261 A1 | 3/2006 | Finkenzeller |
| 2006/0246910 A1 | 11/2006 | Petermann |
| 2006/0287003 A1 | 12/2006 | Moinzadeh |
| 2007/0087756 A1 | 4/2007 | Hoffberg |
| 2007/0124625 A1 | 5/2007 | Hassan |
| 2007/0155360 A1 | 7/2007 | An |
| 2007/0162834 A1 * | 7/2007 | Banerjee ..................... 714/784 |
| 2007/0211624 A1 | 9/2007 | Schmidt |
| 2007/0258398 A1 | 11/2007 | Chestnutt |
| 2007/0264964 A1 * | 11/2007 | Birmingham ................ 455/403 |
| 2008/0025295 A1 | 1/2008 | Elliott |
| 2008/0039017 A1 | 2/2008 | Kim |
| 2008/0056469 A1 | 3/2008 | Preston |
| 2008/0107094 A1 | 5/2008 | Borella |
| 2008/0132200 A1 | 6/2008 | Shinoda |
| 2008/0140394 A1 | 6/2008 | Holmes |
| 2008/0143497 A1 | 6/2008 | Wasson |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0088180 A1 | 4/2009 | LaMance |
| 2009/0110033 A1 | 4/2009 | Shattil |
| 2009/0265173 A1 | 10/2009 | Madhavan |
| 2009/0298428 A1 | 12/2009 | Shin |
| 2009/0304057 A1 | 12/2009 | Werner |
| 2009/0306976 A1 | 12/2009 | Joetten |
| 2010/0197322 A1 | 8/2010 | Preston |
| 2010/0211660 A1 | 8/2010 | Kiss |
| 2011/0211625 A1 | 9/2011 | Birmingham |
| 2011/0287736 A1 | 11/2011 | Hirano |
| 2011/0312322 A1 | 12/2011 | Garrett |
| 2012/0040651 A1 | 2/2012 | Quimby |

FOREIGN PATENT DOCUMENTS

| | | |
|---|---|---|
| DE | 199 48 966 A1 | 4/2000 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 753 A1 | 6/1993 |
| EP | 0 545 783 A1 | 6/1993 |
| EP | 0 580 397 A2 | 1/1994 |
| EP | 0 889 610 A2 | 1/1999 |
| EP | 0 896 442 A1 | 2/1999 |
| EP | 1 093 253 A2 | 4/2001 |
| EP | 1 329 693 A2 | 7/2003 |
| EP | 01 950 402 | 12/2004 |
| EP | 1 843 503 A2 | 10/2007 |
| GB | 2 290 005 A | 5/1994 |
| JP | 03232349 | 10/1991 |
| JP | 5130008 | 5/1993 |
| JP | 05-207107 | 8/1993 |
| JP | 5252099 | 9/1993 |
| JP | 6077887 | 3/1994 |
| JP | 8-293832 A | 11/1996 |
| JP | 09-259391 | 9/1997 |
| JP | 10-215328 | 7/1998 |
| JP | 10-232138 | 8/1998 |
| JP | 11109062 | 4/1999 |
| JP | 11-312285 | 11/1999 |
| JP | 2002-68925 | 3/2000 |
| JP | P3044064 | 3/2000 |
| JP | 2001-211189 | 7/2001 |
| JP | 2001-238256 | 8/2001 |
| JP | 2002-181921 A | 6/2002 |
| TW | 2010/18163 A | 5/2010 |
| WO | WO 89/12835 A1 | 12/1989 |
| WO | WO 91/07044 A1 | 5/1991 |
| WO | WO 95/21511 A1 | 8/1995 |
| WO | WO 96/07110 A1 | 3/1996 |
| WO | WO 96/15636 A1 | 5/1996 |
| WO | WO 96/18275 A1 | 6/1996 |

| | | | |
|---|---|---|---|
| WO | WO 98/34164 A1 | 8/1998 |
| WO | WO 98/34359 A1 | 8/1998 |
| WO | WO 98/53573 A2 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | WO 99/49677 A1 | 9/1999 |
| WO | WO 00/11893 A1 | 3/2000 |
| WO | WO 01/78249 A1 | 10/2001 |
| WO | WO 01/99295 A2 | 12/2001 |
| WO | WO 02/054694 A1 | 7/2002 |
| WO | WO 03/034235 A1 | 4/2003 |
| WO | WO 03/081373 A2 | 10/2003 |
| WO | 2004/095818 A1 | 4/2004 |
| WO | WO 2009/149356 A2 | 12/2009 |

OTHER PUBLICATIONS

Coleman, A., et al., "Subjective Performance Evaluation of the RPE-LTP Codec for the Pan-European Cellular Digital Radio System," Globecom '89, IEEE Global Telecommunications Conference and Exhibition, vol. 2, Nov. 27-30, 1989, pp. 758-761, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th sup. th IEEE Vehicular Technology Conference: On the Move in the 90's. May 6-9, 1990, pp. 323-325, IEEE, New York, New York.

Feher, "Modems for Emerging Digital Cellular-Mobile Radio System," IEEE Trans. on Vehicular Technology, vol. 40, No. 2, May 1991, pp. 355-365.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Brian W. Martin, "WatchIt: A Fully Supervised Identification, Location and Tracking System," Proceedings of the IEEE, 29th Annual 1995 International Carnahan Conference on Security Technology, Oct. 1995.

Reut, Anton B., "Remote Monitoring of Military Assets Using Commercial Leo Satellites," IEEE Universal Communications Conference Record, Nov. 6-8, 1995, Copyright 1995 IEEE.

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

Brown, et al., "A Reconfigurable Modem for Increased Network . . ." IEEE Trans. on Circuits & Systems for Video Technology, vol. 6, No. 2, Apr. 1996, pp. 215-224.

Jain et al, Potential Networking Applications of Global Positioning Systems (GPS), downloadable at http://www.cis.ohio-state.edu/~jain/papers/gps.htm, pp. 1-40, Apr. 1996.

U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, 20-22, Aug. 1997, pp. 758-761, IEEE, New York, New York.

Werb, Jay and Colin Lanzl, "Designing a Positioning System for Finding Things and People Indoors," IEEE Spectrum, Sep. 1998.

FCC E911 Order, dated Nov. 23, 1998-Jul. 1, 1999.

Werb, Jay and Colin Lanzl, "The Next Generation of Control: Local Positioning," abstract, Feb. 1999, vol. 26.

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.

Vaha-Sipila, A., URLs for Telephone Calls, Request for Comments: 2806, Network Working Group, Apr. 2000, 16 pages.

International Search Report PCT/US00/13288; dated May 15, 2000; Applicant: Integrated Data Communications Inc.

International Search Report PCT/US00/01157; dated May 23, 2000; Applicant: Integrated Data Communications Inc.

Lavigne, R.E. and P. Eng, "Trunking Versus Conventional Radio System," Proceedings of the IEEE, 34th Annual 2000 International Carnahan Conference on Security Technology, Oct. 23-25, 2000.

International Search Report PCT/US01/19845; dated Jun. 22, 2001; Applicant: Airbiquity, Inc.

International Search Report PCT/US01/20021, dated Aug. 21, 2001; Applicant: Airbiquity, Inc.

International Search Report PCT/US01/27238; dated Aug. 30, 2001; Applicant: Airbiquity, Inc.

Bilbao, Alfonso, m-Security (Security and Mobile Telephony), Proceedings of the IEEE 35th Annual 2001, International Carnahan Conference on Security Technology, Oct. 16-19, 2001.

Office Action in U.S. Appl. No. 09/677,486 dated Oct. 16, 2001; 9 pages.

McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.

"Tracking," published on the Internet at http://www.wisetrack.com/tracking.html, posted May 29, 2002, Copyright 2001 by TVL, Inc.

Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.

Lockwood Technology Corporation, "Asset Management," copyright 2002 by Lockwood Technology Corporation, published on the Internet at http://www.lockwoodtechnology.com/ asset_tracking.html, printed May 29, 2002.

International Search Report PCT/US02/00996; dated Jun. 24, 2002; Applicant: Airbiquity, Inc.

Office Action in U.S. Appl. No. 09/625,159 dated Apr. 9, 2003; 15 pages.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

Universal Mobile Telecommunications System (UMTS); Push Architecture (3GPP TR 23.976 version 6.1.0 Release 6); Jun. 2004; 36 pages.

Protean Research Group, "Anycast Routing for Mobile Services (ARMS) Project Overview," Published on the Internet at <http://tang.itd.nrl.navy.mll/5522/anycast/anycast_index.html>. Downloaded from the internet Jan. 19, 2005.

Vocal Technologies, Ltd. Home Page, "Audio Codecs," http://www.vocal.com/data_sheets/audio_codecs.html?glad, accessed Jun. 12, 2005.

International Search Report for PCT/US06/03416, dated Feb. 5, 2007, 3 pages.

Phifer, Lisa A., Surfing the Web Over Wireless, Jan. 1998, http://www.corecom.com/html/ wireless.html, printed May 22, 2007.

International Search Report of International Application No. PCT/US07/64443, dated Sep. 15, 2008.

USPTO Search Authority; PCT/US08/80555 International Search Report; Dec. 19, 2008, 11 pages.

Stolowitz Ford Cowger LLP List of Related Cases dated Dec. 23, 2011.

PCT/US2009/056834 International Search Report dated Dec. 30, 2009; 12 pages.

Supplemental European Search Report for Application 08840726.7 dated Sep. 19, 2012; 8 pages.

International Search Report for PCT/US12/52712 dated Nov. 2, 2012; 4 pages.

Translation of a portion of JP 09-259391 by Sugimura; provided Oct. 11, 2012; 5 pages.

Translation of a portion of JP 10-215328 by Sugimura; provided Oct. 11, 2012; 3 pages.

Translation of a portion of JP 10-232138 by Sugimura; provided Oct. 11, 2012; 2 pages.

Translation of a portion of JP 11-312285 by Sugimura; provided Oct. 11, 2012; 1 page.

Translation of a portion of JP 2001-211189 by Sugimura; provided Oct. 11, 2012; 1 page.

* cited by examiner

FIG. 1 (Background)

FIG. 2 (Background)

EFFICIENT ERROR CORRECTION SCHEME FOR DATA TRANSMISSION IN A WIRELESS IN-BAND SIGNALING SYSTEM

This application is a non-provisional of U.S. Provisional Application No. 61/230,930 filed on Aug. 3, 2009, entitled: EFFICIENT ERROR CORRECTION SCHEME FOR DATA TRANSMISSION IN A WIRELESS IN-BAND SIGNALING SYSTEM which is herein incorporated by reference in its entirety.

COPYRIGHT NOTICE

©2009 Airbiquity, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Wireless telecommunication coverage has become nearly ubiquitous in much of the world, especially in industrialized countries. In some developing countries as well, whole regions that lack traditional copper-wired telecom infrastructure have skipped over that technology to deploy wireless instead. Modern wireless networks provide a range of voice and data services. Technical details of those services can be found in many places, for example, the 3GPP standards group web site www.3gpp.org.

Some wireless data services, however, are slow, and coverage is spotty. "SMS" (short message service) is one example. Wireless voice services, by contrast, tend to be of generally good quality and are available almost everywhere people travel. Therefore, voice services are a good choice where reliable, broad coverage is important, for example in the implementation of emergency services, such as requests for police, fire, medical or other emergency services. When people are traveling, especially in motor vehicles, effective wireless communication to reach emergency services is essential.

We refer to "in-band" communications as meaning in the voice channel, as distinguished from a data channel, control channel or other non-voice wireless service. Importantly, voice channels, although optimized for efficient transmission of actual human voice traffic, in fact can be used to transmit relatively small amounts of data as well (e.g., tens or hundreds of bits, rather than megabits.) Voice channels are characterized by special performance characteristics. For example, only a relatively narrow range of audio frequencies needs to be transceived, based on the normal human voice. In fact, sophisticated compression and coding techniques are known to enable sending and receiving human voice very efficiently over digital wireless networks. However, these voice coders or "vocoders"—typically implemented in software, DSP chips and the like—do not transmit non-voice sounds well at all. To the contrary, they are carefully designed to filter out non-voice signals.

FIG. 1 is a simplified block diagram illustrating the typical speech path for a wireless voice call; i.e., a telephone call over the wireless telecommunications network. Analog voice signals from a microphone are digitized by an A/D converter, and then fed to a vocoder encoding algorithm (at 8000 samples/sec). The encoder produces packets of compressed data (typically one packet per 20-ms frame of audio) and feeds this data stream to a radio transceiver. On the other side, a radio receiver passes the packets to the decoding algorithm, which then reconstructs (imperfectly) the original voice signal as a PCM stream. This PCM stream is eventually converted back into an analog voltage which is then applied to a speaker.

Using this type of system, modest amounts of data (here we mean user data, not vocoder speech data) can be transmitted "in-band" through careful selection of frequencies, timing, and the use of special techniques that "trick" a vocoder into transmitting information by making that information "look like" human voice data. This type of data communication, using the voice channel of a wireless system, is sometimes called "in-band signaling." It can be implemented in hardware and or software referred to as an "in-band signaling modem," borrowing the old modem term (modulator-demodulator) familiar in traditional "land line" telecommunications.

Several issued patents disclose in-band signaling technology that communicates digital data over a voice channel of a wireless telecommunications network. In one example, an input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network. In some cases, the data carrying "tones" are sent along with simultaneous voice. The tones can be made short and relatively unobtrusive. In other implementations, sometimes called "blank and burst," the voice is cut off while data is transmitted through the voice channel. In still other implementations, portions of the audio frequency spectrum are used for voice, while other portions are reserved for data. This aides in decoding at the receiving side.

Today, many vehicles have some capability for communications over a wireless networks. We refer to these vehicle systems as a telematics client system. FIG. 2 is a simplified block diagram of an illustrative In-Vehicle System (IVS). It shows an example of the relevant portion of a typical telematics client system. This client system consists of embedded hardware and software designed to operate in an automobile environment.

In FIG. 2, the telematics software includes a "customer application," which may be almost any application, in particular one that employs data transfer via the wireless network. For example, the customer application may relate to navigation or entertainment. In operation, the customer application conveys data (preferably data packets) to an in-band signaling modem. The in-band modem converts the data (along with packet headers and other overhead as appropriate) into audio frequency tones. The audio "data tones" are encoded, much like voice content, and transmitted to a remote receiver.

As in any communication system, errors can occur in the process of in-band signaling. Detection and correction of errors is challenging in the context of in-band signaling because the transfer bandwidth is very low. Typically, the amounts of data transferred (payload size) are small, on the order of tens or hundreds of bytes. Accordingly, adding significant overhead for error detection and or correction is difficult in this already narrow-band environment. A need remains for highly efficient forward error correction methods for use in in-band signaling data communication systems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a mobile device segments a payload for transmission to a remote server and provides redundant data for each payload segment. The remote server examines the received payload on a per segment basis using the redundant data to identify segments associated with errors. The server then requests error correction bits for the identified segments using one or more exchanges with the mobile device. Thereafter, the server can perform error correction using the received error correction bits and then request re-transmission of the payload, if needed. Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
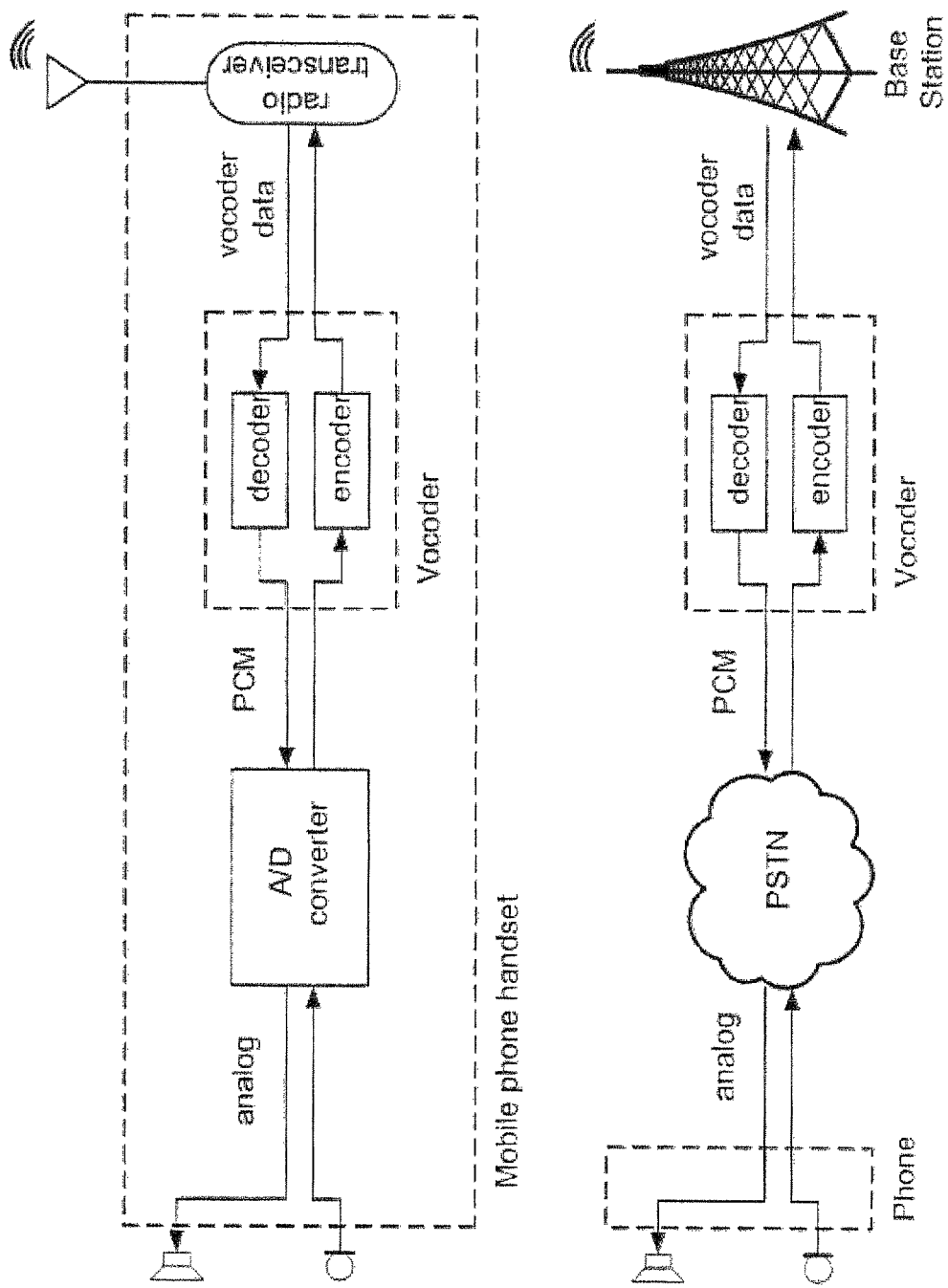
FIG. 1 is a simplified block diagram illustrating the typical speech path for a wireless voice call.
Figure 2:
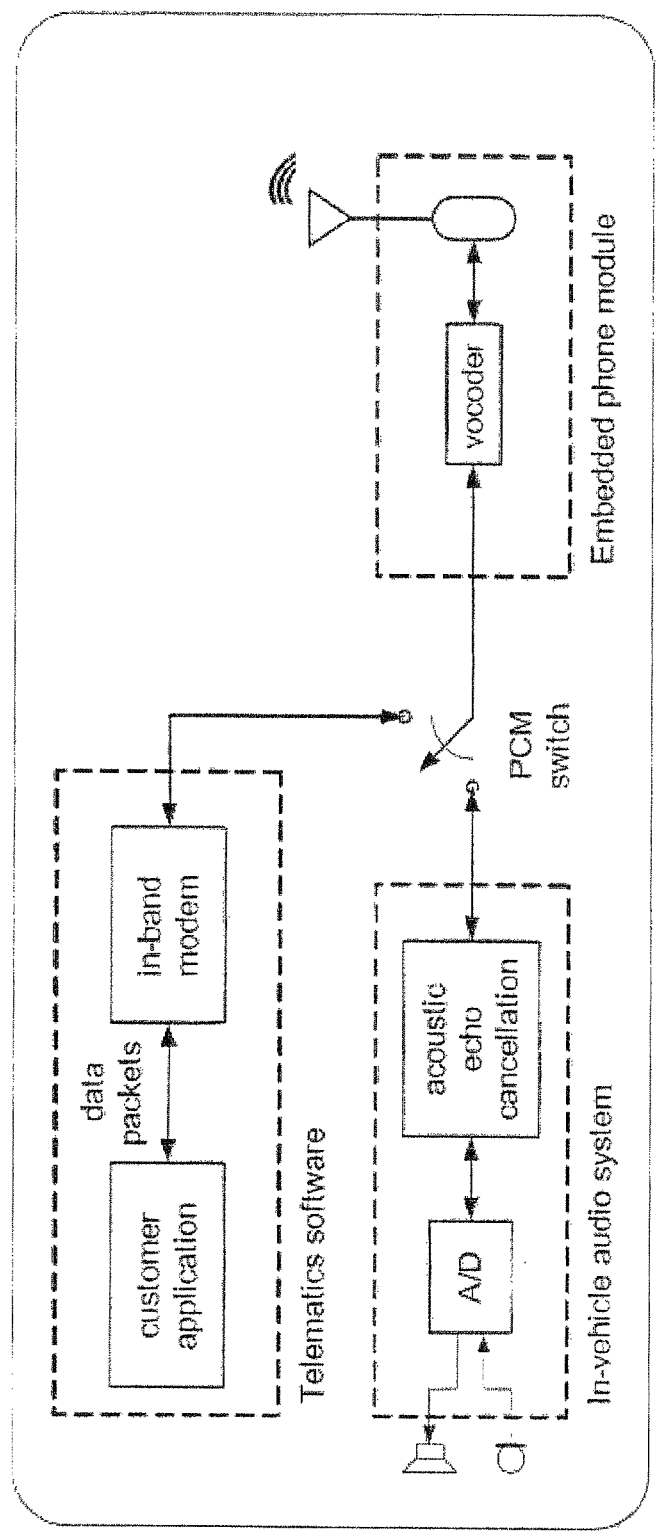
FIG. 2 is a simplified block diagram of an illustrative In-Vehicle System (IVS) with an embedded mobile phone module.
Figure 3:
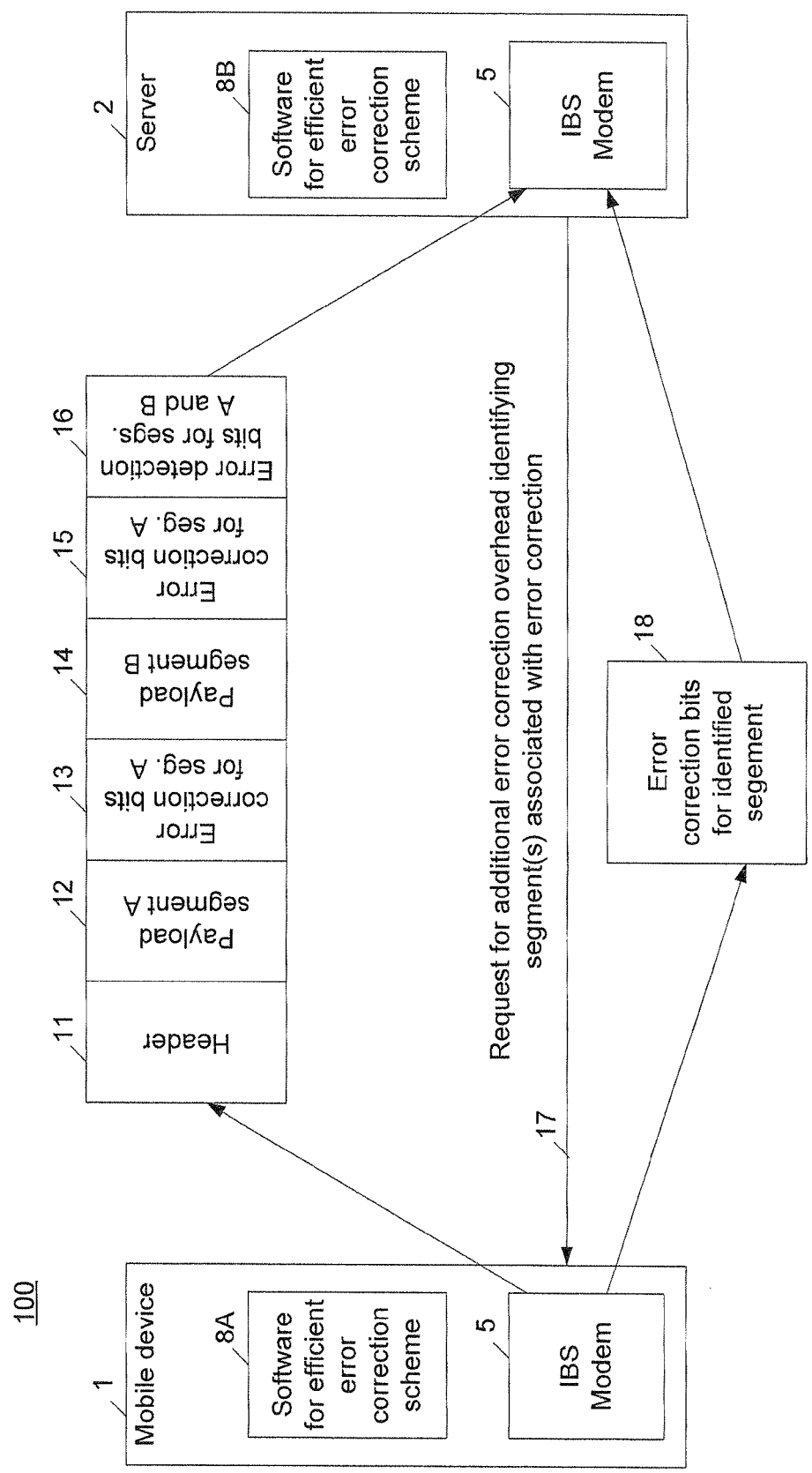
FIG. 3 illustrates one example of a system using an efficient error correction scheme for an in-band signaling exchange.

FIG. 3 illustrates one example of a system using an efficient error correction scheme for an in-band signaling exchange.

The system 100 includes a mobile device 1 configured to operate an efficient error correction scheme over a voice band connection with the server 2. The software 8B identifies where additional error correction bits are likely to be needed to correct errors in the payload on a per segment basis using the error correction bits 13 and 15 attached thereto. The software 8B then requests 17 from the software 8A a subsequent transmission over the voice band connection of additional error correction overhead 18 for identified segments. These subsequent transmissions are sent prior to performing re-transmissions, a term generally used to refer to re-transmitting the payload data to which the error correction bits correspond.

This error correction scheme allows an administrator or designer to make aggressive assumptions about the underlying network between the MS modems 5 when setting the default for error correction overhead, without compromising the ultimate reliability of communications between the mobile device 1 and the server 2. This is particularly useful in combination with in-band signaling, where the underlying wireless networks that provide the nearly ubiquitous coverage for the in-band signaling use a wide variety of vocoders (and other signal processing components) that process signals in different ways.

To better understand why this error correction scheme is particularly useful in combination with in-band signaling, consider the conventional design tradeoffs made by an administrator or designer when setting a default amount of error correction overhead to go with the initial transmission of the payload in an in-band signaling context. Since the administrator or designer does not know beforehand all the vocoder combinations that could be operating between the IBS modems 5, the administrator or designer may use conservative default settings, e.g. high error correction overhead, to provide reliability in the majority of scenarios. However, the tradeoff for high error correction overhead as a default is that this high overhead will consume a significant portion of the relatively small available bandwidth in the voice band, adding latency to calls, which may not be needed in many of the scenarios. As a result, the default amount of error correction chosen by the administrator or designer is ultimately an undesirable compromise between reliability, latency, and available bandwidth.

Re-transmission schemes, e.g. where the payload is re-transmitted, can provide a partial solution to this problem; however, these schemes, if overly relied upon, can utilize too much of the relatively low bandwidth available in the voice band (by constantly re-transmitting the payload). Other existing re-transmission schemes can consume too much of the bandwidth of the relatively narrow voice band.

In contrast, the error correction scheme in system 100 allows the administrator or design to utilize relatively low error correction overhead by default, while still providing reliability in most scenarios. This is because the software 8A is configured to segment the payload of the packet (namely the packet having the header 11, the redundant data 13/15/16, and the payload data 12/14 to which the redundant data corresponds), and the software 8B is configured to request additional error correction to correct received/demodulated bits on a per segment basis. Where this initially transmitted overhead is not sufficient given a particular scenario, additional error correction bits can be particularly requested using subsequent transmission.

As compared to re-transmissions, e.g. of the payload data corresponding to the error correction bits, these subsequent transmissions may consume a relatively small amount of bandwidth. Of course, even in cases where these subsequent transmissions are large, such error correction scheme is generally a more effective use of bandwidth on a per-bit-basis for purposes of resolving transmission errors than re-transmitting the payload data. As will be described later in greater detail, re-transmission of the payload data 12/14 can be performed if an analysis of the entire packet according to the appended error detection bits 16 detects errors remaining after the exchange between the software 8A and 8B. In any case, if the system 100 does use re-transmissions after the transmitting of the additional error correction bits 18, it should be apparent that, due to the request(s)/response(s) 17/18, such re-transmissions will be needed less often in the system 100 than conventional systems utilizing a same default amount of error correction bits.

The server 2 described above operates in an Internet Protocol (IP) network in communication with a telecommunications network of the mobile device 1. In other examples, the server 2 can operate in any network in communication with the telecommunications network of the mobile device 1. The mobile device can be part of an In-Vehicle System (IVS) or any other type of mobile device capable of communicating with a wireless telecommunications network.

It should be apparent the principles described above can be utilized in other environments besides in-band signaling systems. For example, the principles described above are particularly useful in any environment where bandwidth is limited.

Figure 4:
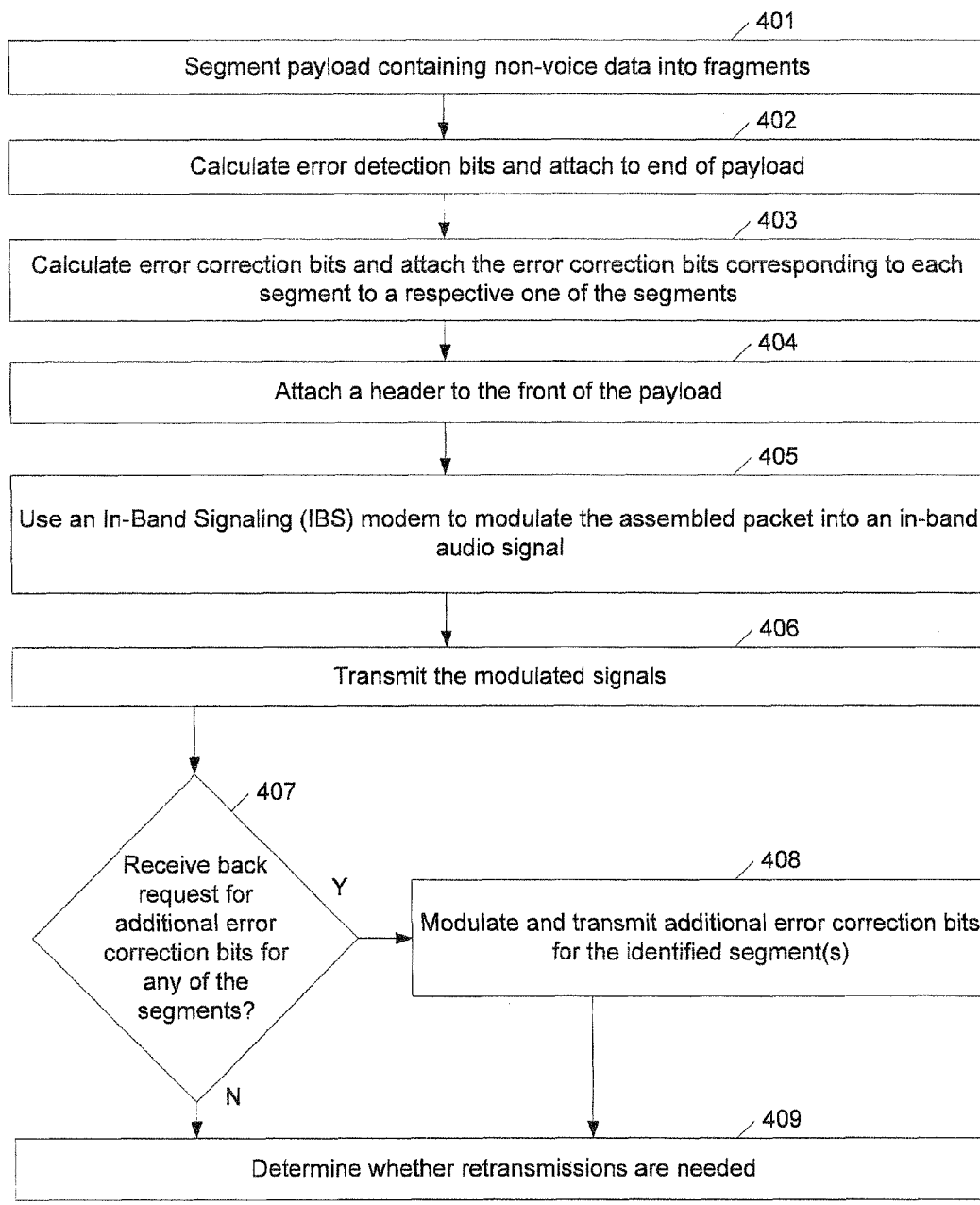
FIG. 4 is a flow chart illustrating operation of the mobile device shown in FIG. 3.

FIG. 4 is a flow chart illustrating operation of the mobile device shown in FIG. 3.

Referring to FIG. 3 and FIG. 4, in block 401, the mobile device 1 segments a payload containing non-voice data into fragments. In one example, the payload contains 200 or 300 bytes of data, which is divided into smaller segments, for example 10 or 12 bytes per segment, for a total of approximately 20 payload segments.

The mobile device 1 calculates error detection bits, for example Cyclic Redundancy Check (CRC) bits, and attaches such error detection bits to the end of the payload in block 402. The mobile device 1 calculates error correction bits, for example Forward Error Correction (FEC) bits and attaches such error correction bits corresponding to each segment to a respective one of the segments in block 403. It should be understood that the error correction bits do not necessarily need to be appended to their respective segment as shown in FIG. 3 and described in FIG. 4 as long as there is a mechanism for the receiver to associate the error correction bits with a respective segment. In block 404, the mobile device 1 attaches a header to the payload, forming a packet. It should be understood the processes 401-404 can occur in any order.

In block 405, the mobile device 1 uses its IBS modem to modulate the assembled packet into an in-band audio signal. The mobile device 1 transmits the modulated signals in block 406.

In block 407, the mobile device 1 determines whether it has received back any requests for additional error correction bits corresponding to one or more of the payload segments. If the mobile device 1 has received back such a request, in block 408 the mobile device 1 modulates and transmits additional error correction bits for segment(s) identified by the request(s). These transmissions include only redundant data, e.g. additional error correction bits, not the payload itself. Typically, these additional error correction bits will correspond to only a selected subset (selected by the server based on an analysis of the error correction bits in the original transmission) of the payload.

In any of the instances where the server 2 identifies segments to the mobile device 1 (or visa versa), such identification can be made in any fashion, such as using serial numbers assigned to the segments by the mobile device 1 when originally segmenting the payload.

In block 409, the mobile device 1 determines whether re-transmissions are needed. This typically includes determining whether a request is received to re-transmit some or all of the packet (this request is generated by the server and discussed in more detail with reference to FIG. 5). If the re-transmissions are for only some of the packet, such portions can be designated by identifying the corresponding segments, as discussed previously.

Figure 5:
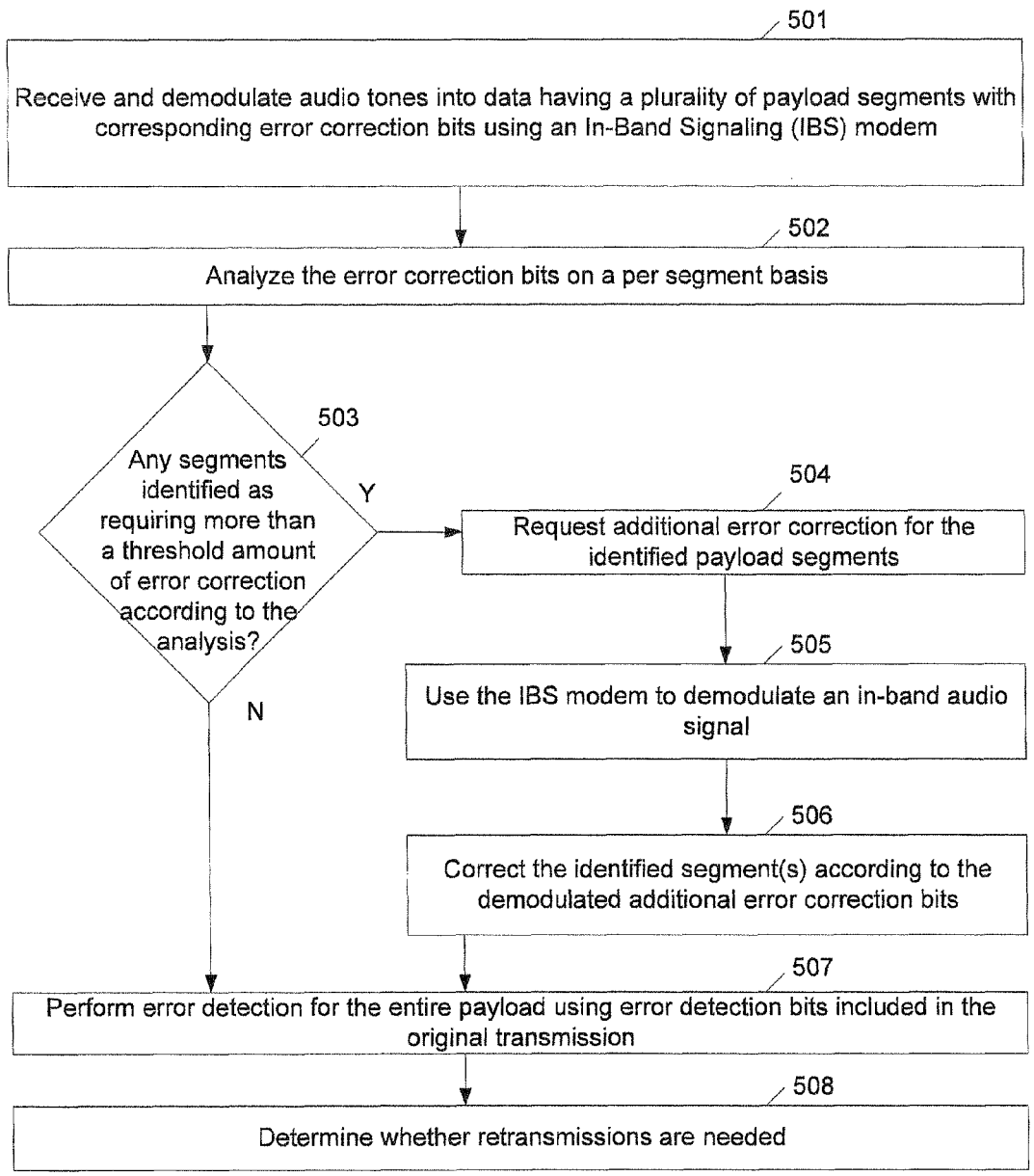
FIG. 5 is a flow chart illustrating operation of the mobile device shown in FIG. 3.

FIG. 5 is a flow chart illustrating operation of the server shown in FIG. 3.

Referring to FIG. 3 and FIG. 5, in block 501 the server 2 receives and demodulates audio tones into data having a plurality of payload segments with corresponding error correction bits using an MS modem. The payload segments correspond to a same packet having a header and a payload, and typically this packet is appended with error detection bits as well.

In block 502, the server 2 analyzes the error correction bits on a per segment basis. This includes examining a segment using the error correction bits corresponding to that segment to determine if bit corrections can be made.

With FEC and other error correction schemes, a bit correction does not necessarily indicate that all errors have been corrected. Typically, the more bit corrections are made, the greater the likelihood that the segment will contain uncorrected errors even after the bit correction; therefore, additional error correction bits can be requested for those segments reaching a threshold amount of error correction (this threshold can be any error correction in some examples). This threshold can be adjusted during operation according to whether subsequent error detection using the error detection bits (such as CRC bits) indicates errors or not. For example, the threshold may need to be reduced if previous error detection analyses resulted in too much re-transmission of the payload segments. The threshold can be set according to a number of corrections per segment, a percentage of corrected bits in the segment relative to total bits in the segment, a scheme that considers the position of the corrected bits adjacent to each other or relative to the ends of the segments, etc.

If any segments are identified as requiring more than a threshold amount of error correction in diamond 503, then in block 504 the server 2 requests additional error correction for the identified payload segments. In block 505, the server 2 uses the IBS modem to demodulate an in-band audio signal. In block 506, the server 2 corrects the identified payload segments according to the additional error correction bits.

It should be understood that the blocks 504-506 can be repeated any number of times before continuing to block 507. For example, the server 2 can re-examine identified segments using the additional error correction bits. According to this re-examination, the server 2 can request yet further error correction bits for any ones of these identified segments. In one example, the further error corrections bits are requested for any segment associated with more errors during the re-examination than the previous examination, which is an indication that the further error correction bits could yield even more corrections. This process could keep repeating until the most newly received error correction bits yield no addition errors with respect to a previous error correction.

In block 507, the server 2 performs error detection for the entire payload using error detection bits included in the original transmission. In block 508, the server 2 determines whether re-transmissions are needed. It should be understood that deferring any re-transmission of the payload data until completing the exchange discussed above can preserve bandwidth because such re-transmissions often will not be needed after completing the exchange discussed above.

Block 508 typically involves the server 2 performing error correction on all received segments using the initially transmitted error correction bits and the subsequently transmitted error correction bits (whether these subsequent transmissions are a single subsequent transmission or a series of subsequent transmissions). After performing error correction using the initially transmitted error correction bits and the subsequently transmitted error correction bits, the server 2 performs error detection on the entire payload using the error detection bits from the initial transmission. If the error detection on the entire payload indicates errors, the server 2 can generate a request for the mobile device 1 to re-transmit some or all of the payload. If the re-transmission is requested, the server 2 may exploit "time diversity", which is explained in more detail in commonly-assigned application Ser. No. 11/442,705 filed May 26, 2006 and incorporated herein by this reference.

In the example described with references to FIGS. 3-5, the transmitter side segments a payload prior to transmission, which allows requests for redundant data to be made on a per-segment basis. In some examples, the per-packet payload is small enough that the segmenting discussed above provides fewer advantages. In such cases, the transmitter side may not perform segmenting and the receiver side can make requests for redundant data on a per-payload basis. Or, if a segmenting algorithm is still used in such cases, the small payloads make be no larger than the segment size, causing segmenting to result in a single segment per payload. The single segment is still associated with an identifier and the receiver side could still use such identifier to make requests for redundant data on a per-segment basis.

In the example described with reference to FIGS. 3-5, the initial transmission includes error correction bits associated with each segment and error detection bits for the entire payload. In other examples, there may be separate error detection bits associated with each segment in addition to, or instead of, the error correction bits for each segment. Subsequent transmissions provide error correction bits on a per segment basis.

The term "error correction bits" refers to any type of redundant data that can be used to correct errors occurring during transfer of the payload. A non-exhaustive list of examples includes FEC, Reed-Solomon error correction, etc. It should be understood that the error correction bits associated with each segment perform the error detection function in diamond 503 based on a threshold amount of error correction. The term "error detection bits" refers to any type of redundant data used for detecting errors occurring during transfer of the payload. A non-exhaustive list of examples types of error detection schemes includes parity schemes, checksum schemes, cyclic redundancy checks, etc. Many types of redundant data may be used for both error correction and error detection.

It should be understood that, in either of the above examples, there may be a series of per segment requests for error correction bits. For example, a first request or group of requests may be used to obtain error correction bits for a subset of the segments. Error identification can be repeated using the requested error correction bits, and if needed, a second request or group of requests for additional error correction bits can be sent. The second request or group of requests can be for the same subset of segments, or a reduced subset of segments.

The amount of error correction bits can be increased (per segment) at each successive request/response exchange. In such an example, the system gradually escalates the number of overhead bits transmitted via the in-band modem, so that overhead is minimized when the environment and system characteristics permit relatively error-free reception. On the other hand, as and when necessary, the overhead bits will "scale up" to meet the needs of a more challenging (error prone) environment. In this way, more efficient use of limited bandwidth can be achieved.

Also, in the example above, the request/response exchanges provided only redundant data for the identified segments of the packet. In other examples, the request/response exchanges could also re-transmit the segment itself with the request redundant data, and the error correction using the requested redundant data could be applied to the re-transmitted segment. It should be apparent that this example, while consuming greater bandwidth than the example above in many scenarios, can still realize bandwidth savings as compared to traditional re-transmission schemes that re-transmit entire packet communications.

In any of the examples discussed above, if successive request/response exchanges are used, there can be any number of request/response exchanges. The server can send as many requests as needed to correct errors, or the server can perform up to a fixed number of request/response exchanges and then fall back to re-transmission of the payload if uncorrected errors remain. Or, the server can perform as many request/response exchanges as needed until a predefined time period ends, and then fall back to re-transmission of the payload if uncorrected errors remain.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical mobile device or server is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A memory device having instructions stored thereon that, in response to execution by a processing device, cause the processing device to perform operations comprising:
  recovering digital data from a voice band of a wireless telecommunications network, said recovering including demodulating audio tones from the voice band using an in-band signaling modem, wherein the digital data comprises a packet having a header and a payload, wherein the payload includes a plurality of segments each having redundant data corresponding thereto;
  examining the segments using their corresponding redundant data and identifying one(s) of the segments that are associated with error(s);
  transmitting a signal responsive to identifying the one(s) of the segments that are associated with the error(s);
  responsive to the transmitting the signal identifying the one(s) of the segments that are associated with the error(s), subsequently recovering additional digital data from the voice band of the wireless telecommunications network, said subsequent recovering including demodulating additional audio tones from the voice band using the in-band signaling modem, wherein the additional digital data comprises error correction bits;
  correcting the payload of the packet using the error correction bits;
  receiving via the voice band of the wireless telecommunications network a plurality of identifiers, each identifier corresponding to a different one of the segments of the plurality of segments;
  inserting into the signal only those identifiers of the recovered plurality of identifiers that correspond to the identified one(s) of the segments; and
  subsequently recovering the additional digital data from the voice band of the wireless telecommunications network responsive to transmitting the signal containing only those identifiers of the recovered plurality of identifiers that correspond to the identified one(s) of the segments.

2. The memory device of claim 1, wherein the operations further comprise:
  performing bit correction on the identified one(s) of the segments using respective ones of the error correction bits to identify any such segments that correspond with an increase in associated error(s); and
  generating and sending a request for additional error correction bits for the identified one(s) of the segments having the increase in the associated error(s).

3. The memory device of claim 2, wherein the operations further comprise:
  repeating bit correction using the most recently received error correction bits as well as the generating and sending in response thereto until a current correction indicates no new error(s) with respect to a previous correction; and
  examining a result of the repetition using error detection bits received with the packet to determine whether there are uncorrected error(s) remaining.

4. The memory device of claim 1, wherein the operations further comprise:
  when error(s) are discovered, deferring any requests for re-transmission of content to which the error correction bits correspond until receiving a series of responses to a series of requests for additional error correction bits.

5. The memory device of claim 4, wherein the series of responses provide gradually increasing amounts of error correction information for a particular one of the segments.

6. The memory device of claim 1, wherein the error correction bits comprise Forward Error Correction (FEC) information.

7. The memory device of claim 6, wherein the operations further comprise:
  examining the corrected payload using error detection bits included with the packet to determine whether there are uncorrected error(s) remaining; and
  requesting re-transmission of the payload if the examination using the error detection bits indicates uncorrected error(s) remaining.

8. The memory device of claim 7, wherein the error detection bits comprise Cyclic Redundancy Check (CRC) information.

9. The memory device of claim 1, wherein said redundant data comprises at least one of error detection bits and error correction bits.

10. A memory device having instructions stored thereon that, in response to execution by a processing device, cause the processing device to perform operations comprising:
  generating redundant data corresponding to each segment of a segmented packet payload;
  modulating the segmented packet payload and the generated redundant data using an In-Band Signaling (IBS) modem and transmitting signals resulting therefrom over a voice band of a wireless telecommunications network;
  receiving back a response requesting error correction bits for an identified segment;
  modulating the error correction bits for the segment identified in the request and transmitting signals resulting therefrom over the voice band of the wireless telecommunications network;
  transmitting via the voice band of the wireless telecommunications network a plurality of identifiers, each identifier corresponding to a different one of the segments of the segmented packet payload;
  examining the received response to ascertain which one(s) of the plurality of identifiers is included therein; and
  modulating the error correction bits for the segment identified in the request responsive to ascertaining which one(s) of the plurality of identifiers is included in the received response.

11. The memory device of claim 10, wherein the operations further comprise:
  after transmitting the signals resulting from the modulation of the error correction bits, receiving back another response requesting additional error correction bits for a subsequently identified segment; and
  modulating the additional error correction bits for the subsequently identified segment and transmitting signals resulting therefrom over the voice band of the wireless telecommunications network.

12. The memory device of claim 11, wherein the additional error correction bits corresponding to the segment comprise more information than the error correction bits corresponding to the segment.

13. The memory device of claim 11, wherein the operations further comprise:
  generating reference identifiers for all the segments and transmitting information mapping the generated reference identifiers with their associated segments along with the segmented packet payload.

14. The memory device of claim 13, wherein the request identifies the portion of the segments using the reference identifiers.

15. A method, comprising:
recovering digital data from a voice channel of a wireless telecommunications network, said recovering including demodulating audio tones from the voice band using an in-band signaling modem, wherein the digital data comprises a packet having a header and a payload, wherein the payload includes data and redundant data corresponding thereto;
examining the payload using the corresponding redundant data to identify a portion of the payload as being associated with error(s);
generating and sending a request for error correction bits for the identified portion;
responsive to sending the request for the error correction bits for the identified portion, subsequently recovering additional digital data from the voice band of the wireless telecommunications network, said subsequent recovering including demodulating additional audio tones from the voice channel using the in-band signaling modem, wherein the additional digital data comprises error correction bits;
correcting the payload using the error correction bits;
receiving via the voice channel of the wireless telecommunications network a plurality of identifiers, each identifier corresponding to a different segment of the packet;
inserting into the request only those identifiers of the recovered plurality of identifiers that correspond to segment(s) of the identified portion; and
subsequently recovering the additional digital data from the voice channel of the wireless telecommunications network responsive to sending the request containing only those identifiers of the recovered plurality of identifiers that correspond to the segment(s) of the identified portion.

16. The method of claim 15, further comprising generating and sending the request for the error correction bits for only a subset of the payload.

17. The method of claim 15, further comprising:
detecting error(s) in the corrected payload using error detection bits included in the packet; and
if error(s) are detected, requesting re-transmission of the packet.

18. The method of claim 15, wherein the redundant data comprises Forward Error Correction (FEC) information or Cyclic Redundancy Check (CRC) information.

19. A method, comprising:
generating redundant data corresponding to a packet payload;
modulating a packet containing the payload data and the redundant data using an In-Band Signaling (IBS) modem and transmitting initial signals resulting therefrom over a voice channel of a wireless telecommunications network;
receiving back a response requesting error correction bits for an identified portion of the payload data;
modulating the error correction bits for the identified portion of the payload data and transmitting signals resulting therefrom over the voice channel of the wireless telecommunications network;
transmitting via the voice channel of the wireless telecommunications network a plurality of identifiers, each identifier corresponding to a different segment of the packet payload;
examining the received response to ascertain which one(s) of the plurality of identifiers is included therein; and
modulating the error correction bits for the identified portion responsive to ascertaining which one(s) of the plurality of identifiers is included in the received response.

20. The method of claim 19, wherein the redundant data comprises error correction information or error detection information.

21. The method of claim 19, further comprising:
performing a series of transmissions providing Forward Error Correction (FEC) bits for a particular portion of the payload data, wherein each transmission increments the number of FEC bits included therein for the particular payload data.

22. The method of claim 19, wherein the initially transmitted signals represent both payload data and the redundant data, and wherein the subsequently transmitted signals represent only redundant data, and the method further comprises:
transmitting signals representing the payload data after providing the error correction bits.

* * * * *